March 31, 1959
R. C. DU BOIS
2,879,802
DIFFERENTIAL PRESSURE-RESPONSIVE DEVICE
Filed April 9, 1956
2 Sheets-Sheet 1
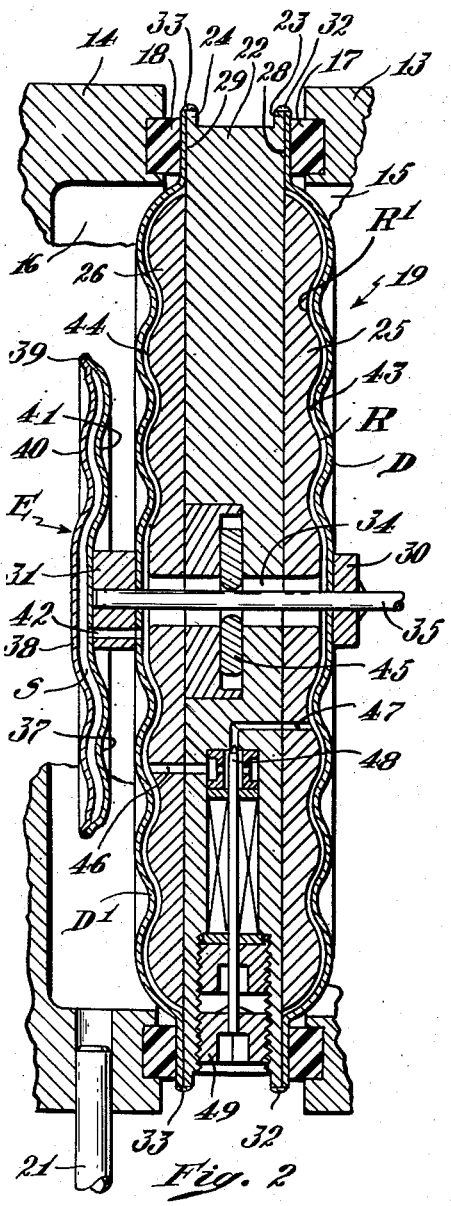
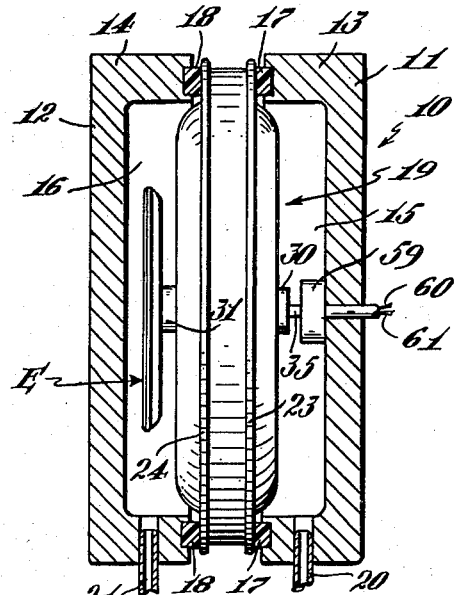
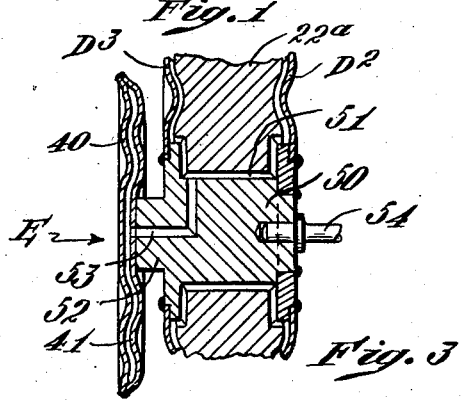
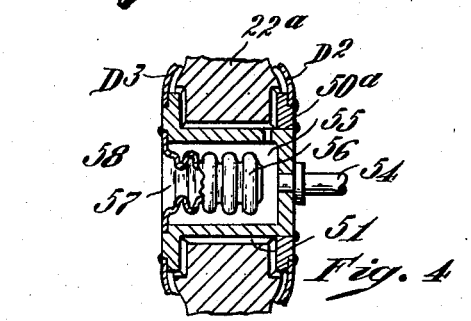
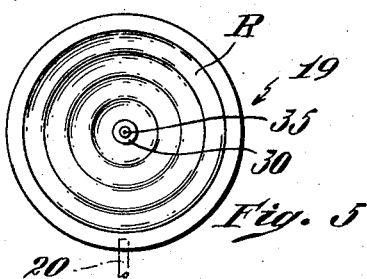
Inventor
Robert C. Du Bois
by Roberts Cushman & Groover
Attys March 31, 1959  R. C. DU BOIS  2,879,802
DIFFERENTIAL PRESSURE-RESPONSIVE DEVICE
Filed April 9, 1956  2 Sheets-Sheet 2

Inventor
Robert C. Du Bois
by Roberts Cushman & Grover
Attys

United States Patent Office 2,879,802
Patented Mar. 31, 1959

2,879,802

DIFFERENTIAL PRESSURE-RESPONSIVE DEVICE

Robert C. Du Bois, Fairfield, Conn., assignor to Manning, Maxwell & Moore, Incorporated, Stratford, Conn., a corporation of New Jersey Application April 9, 1956, Serial No. 576,962

8 Claims. (Cl. 137—779)

This invention pertains to differential pressure-responsive devices of that type wherein opposed pressure-sensitive elements are arranged within a rigid housing and subjected to differential pressures. It is contemplated that the invention may be embodied in various types of instruments, for instance those of the deflectional type or those of the force-balance type.

Among the objects of the present invention are to provide a differential pressure-sensitive device, of simple and inexpensive construction, but which is sensitively responsive to pressure variations; to provide a pressure-sensitive device so devised that it will withstand the application of excessive pressures without damage; to provde a pressure-responsive device wherein two chambers, each having a movable wall exposed to external pressure variations are connected by a passage and wherein an incompressible fluid fills both chambers and the passage, and with means to restrict the flow of fluid through the passage thereby to damp vibrations of the movable walls; and to provide a device of the above type wherein fluid fills a space having a movable wall and with means for compensating for the expansion or contraction of the fluid due to temperature changes; to provide a device of the above type wherein the opposed movable walls are connected by rigid means whereby said walls are compelled to move as a unit in response to pressure differentials and wherein a transmission element is so associated with said rigid connecting means as to be actuated by movement of the latter; and to provide a device of the above type having pressure-responsive elements which are simple diaphragms arranged at opposite sides of a heavy, rigid core which provides a support for either diaphragm if the said diaphragm be subjected to excessive external pressure. A further object is to provide a device of the above type wherein the diaphragms are corrugated and that outer surface of the core which is opposed to each respective diaphragm has a contour substantially like that of the outer surface of the adjacent diaphragm, whereby, in response to excess pressure, the diaphragm may contact said surface of the core throughout its entire area and thus find support to prevent rupture. Other and further objects and advantages of the invention will be pointed out in the following more detailed description and by reference to the accompanying drawings, wherein Fig. 1 is a diagrammatic section showing a housing having mounted therein a pressure-responsive device in accordance with the present invention;

Fig. 2 is a vertical section to larger scale than Fig. 1, showing the pressure-responsive device in detail, the housing being broken away, and illustrating one form of temperature compensating means;

Fig. 3 is a fragmentary view similar to Fig. 2, but showing a modification;

Fig. 4 is another fragmentary view similar to Fig. 2, but showing a still further modification;

Fig. 5 is a front elevation of the capsule removed from the housing, and to smaller scale than Fig. 1;

Figure 6:
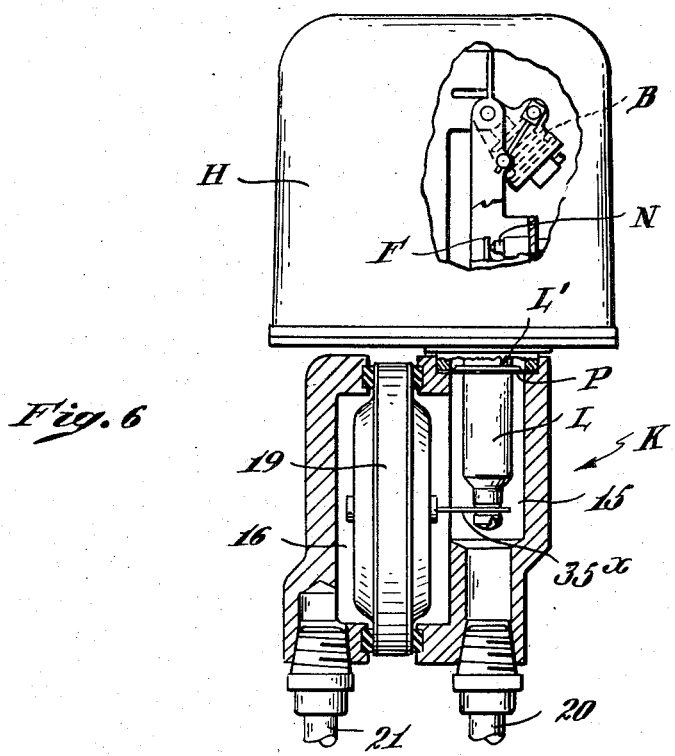
Fig. 6 is a plan view, partly in horizontal section illustrating the embodiment of the device of the present invention in a force-balance apparatus.

Referring to the drawings, the numeral 10 (Fig. 1) indicates in general a housing which may, for example, form a part of the case of an instrument, whether of the deflectional type or the force-balance type. As here illustrated, for convenience but without any limiting intent, this housing 10 is of approximately circular form, comprising two substantially like rigid members 11 and 12 having peripheral flanges 13 and 14 respectively, which are directed toward each other and which define spaces 15 and 16 within the respective members of the housing. These housing members will in use be secured in assembled relation by any suitable means, for example bolts or the like, not here shown. As here illustrated, the opposed edges of the flanges 13 and 14 are provided with channels which receive rings 17 and 18 respectively, of packing material, for example a rubber composition or the like, between which the marginal portion of the pressure-responsive capsule 19, hereinafter more fully described, is clamped providing a leak-tight partition between the spaces 15 and 16. Pipes or conduits 20 and 21, secured in openings in the flanges 13 and 14, provide for the admission of pressure fluid to the spaces 15 and 16 respectively.

Referring more particularly to Fig. 2, the capsule 19 comprises a core, shown in Fig. 2 as including a rigid central plate 22, here shown as of circular form and generally disk-like in character but having radial peripheral flanges 23 and 24 adjacent to its opposite plain faces. As illustrated in Fig. 2, rigid circular backing plates 25 and 26 are arranged at opposite sides of the central plate 22, these backing plates 25 and 26 being coaxial with the plate 22 and secured to the opposite faces of the plate 22, for example by welding or the like. The core, whether consisting of a single part, or comprised of a plurality of assembled parts, is rigid and strong enough to withstand any overload pressure which may reasonably be expected. As shown in Fig. 2, the backing plates 25 and 26 are of a lesser diameter than the plate 22, and being arranged concentrically with reference to the latter, leave exposed marginal portions 28 and 29 of the opposite faces of the central plate 22. The outer or exposed surfaces of the backing plates 25 and 26 are corrugated to provide ridges R with intervening valleys R'. As here illustrated, these ridges and valleys are annular and concentric with the divider plate 22, the ridge and valleys merging smoothly into each other so that no abrupt angles are formed.

Disc-type diaphragm members D and D' are arranged adjacent to the outer surfaces of the respective backing plates 25 and 26. These diaphragm discs or plates are of some resilient material, desirably of a type which does not readily corrode. One such material is stainless steel. The thickness of these diaphragm members will depend upon the use to which the device is to be put. For some purposes for instance, diaphragms of stainless steel of the order of 0.005" will be found suitable.

In making the device, these diaphragm discs D and D' are first formed so as to approximate in size, shape and contour the outer surfaces of the assembled plates 22, 25 and 26, the margins of the diaphragm members being substantially flat. These flat margins of the diaphragm members are then placed in contact with the exposed flat marginal surfaces 28 and 29 of the plate 22 and are welded to the flanges 23 and 24, as indicated at 32 and 33 respectively.

Then at a convenient stage of the assembly operation the diaphragms D and D' are subjected, one at a time, to a treatment such as to conform each diaphragm exactly to the outer surface of the corresponding plate 25 or 26. This treatment may for instance be of the impact type of which shot peening is an example, the force thus applied being such as to stress the material of the diaphragm beyond its elastic limit so that the diaphragm tends to keep the shape thus imparted to it, and is so resiliently biased that if permitted to do so, it will contact the backing plate over its entire extent. As thus devised, over-pressure to which the diaphragm may be subjected during use can only move the diaphragm back into intimate contact with the rigid core which so supports it at every point of its area that the diaphragm cannot be ruptured or even permanently distorted by over-pressure. Thus over-pressure cannot cause shift of calibration. Instead of shot peening, the diaphragms may be shaped by the application of a pressure equal or higher than pressures expected to be encountered in the particular service to the exterior of the diaphragms in order to make them conform more exactly to the backing plate. While shot peening is preferable for many applications, as it is both simpler and results in an improvement in the qualities of the diaphragms, the method of over-pressuring the diaphragms may be found more desirable in some cases, such as when the temperature compensating diaphragm capsule is used.

Figure 7:
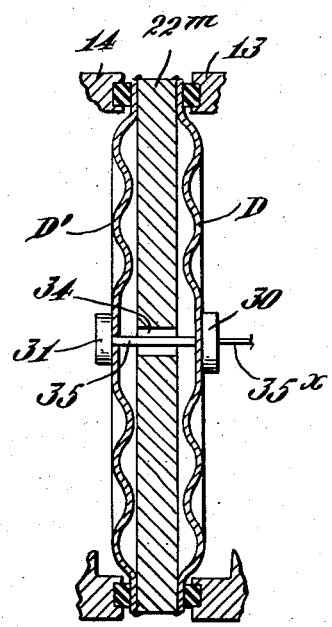
Fig. 7 is a fragmentary section similar to Fig. 3, but to smaller scale, illustrating a modification.

While the arrangement just described is usually preferable, a very considerable degree of protection to the diaphragms is afforded even though the diaphragm-contacting face of the core 22ᵐ be flat, as illustrated in Fig. 7, since the inherent strength of the diaphragm material will ordinarily be such that it will safely bridge between its actual points of contact with the flat surface of the plate. This arrangement is simpler and cheaper than that illustrated in Fig. 2.

While it is not always necessary to provide the device with temperature-compensating means, such a means is here illustrated as an optional feature. This means, as disclosed in Figs. 2 and 3, comprises a capsule E consisting of two auxiliary diaphragm members 40 and 41 which are welded leak-tight at their margins, as shown at 39. This temperature-compensating capsule E has its rear plate 41 welded to a rigid spacer or button 31, which in turn is welded to the center of the diaphragm D', which for convenience, and without limiting intent, may herein be referred to as the rear diaphragm. At the center of the other diaphragm D there is attached a button 30, for example by welding, the buttons 30 and 31 being coaxial with the diaphragms. The central plate 22 of the core and the associated backing plates 25 and 26 are provided with aligned central openings providing a passage 34. A motion transmitting member, shown in Fig. 2 as a rod 35 substantially smaller in diameter than the passage 34, is secured, for example by welding or screw-threading, in a hole in the button 31 and extends leak-tight through an opening in the diaphragm D', thence through the passage in the core, and thence leak-tight through an opening in the diaphragm D, being or otherwise secured in the button 30.

The auxiliary diaphragm plates 40 and 41 forming the capsule E may initially be flat, but after being welded together at their edges they are subjected to external pressure such as to impart to them the corrugated form illustrated in Fig. 2, the plates being so stressed that when released they tend to lie in contact with each other throughout their entire areas.

After the expansion capsule E has been assembled with the other parts, a substantially incompressible fluid, for instance oil, is introduced between the diaphragms D and D' and the respective backing plates. Desirably, the amount of liquid introduced will be a measured volume predetermined to space the diaphragms a desirable distance from the core. The normal widths of the spaces 43 or 44 between the respective diaphragms and the adjacent faces of the core need not substantially exceed one-half the maximum amplitude of motion of the diaphragm, so that the mass of the liquid contained in the spaces within the capsule is small, and because inward motion of either diaphragm, to any substantial amount beyond the normal, is prevented by its contact with the rigid core, the diaphragm may be made very thin and correspondingly sensitively responsive to pressure variations. From the passage 34 in the core this hydraulic fluid flows (if the expansion capsule E may be employed) through a passage 42 in the button 31 and into the spaces between the members 40 and 41, thus separating the latter, while at the same time separating the diaphragms D and D' from the adjacent backing plates 25 and 26. For thus introducing the liquid a suitable capillary tube, not shown, may be arranged, for instance to enter the space S, through which the liquid may be forced into the assembled structure. After the liquid under suitable pressure has been forced into the device, the capillary tube is sealed, thus maintaining this pressure. The liquid normally holds the diaphragms spaced from the adjacent backing plates R and R' thus providing the liquid filled spaces 43 and 44 and also the chamber S, the passage 34 in the core also being filled with this substantially incompressible fluid. Desirably these internal spaces in the capsule are evacuated as a preliminary to the introduction of the fluid.

To avoid rapid vibration of the diaphragms such as might be caused by rapid change in pressure in the chambers 15 and 16, an apertured disc or washer 45 may be arranged within a suitable chamber in the core, this washer being guided so that it may move freely perpendicularly to the axis of the passage 34, the washer having a central opening slightly larger in diameter than the rod 35, thus providing a restricted flow passage so that liquids may move although slowly from the space 43 to the space 44. However, the washer and its intended function are not always necessary and the washer may be omitted when desired.

Optionally, although not necessarily, and in order to provide for varying the rate of flow from the space 43 to the space 44, another passage comprising the parts 46 and 47 may be provided. Intermediate the ends of this passage there is a valve housing seated within a cavity in the plate 22 and within this valve housing there is arranged an adjustable needle valve 48 manually actuable by a movable part 49. By moving this part 49 the valve 48 may be adjusted so as to vary the amount of flow which may take place through the passage comprising the parts 46 and 47. When this valve 48 is entirely closed, a minimum flow is permitted through the opening in the washer 45.

The rod 35 rigidly connects the diaphragm members D and D' so that they are constrained to move as a unit. This rod 35, in the embodiment illustrated in Fig. 1, constitutes motion transmitting means whereby movement of the diaphragms (which constitutes a measure of the differential pressure) may be caused to actuate some part, for example a pressure index cooperable with a graduated scale, such an embodiment of the invention being classified as a deflectional instrument. As illustrated in Fig. 1, the rod 35 enters a casing 59 located within the space 19 in the housing 10, and it is contemplated that the rod may carry a mass of magnetic material disposed inside of an electrical coil whose terminals 60 and 61 are outside of the housing and which may be connected to any suitable electrical instrument responsive to variations in flux in an electrical current in the conductors 60 and 61. This motion of the rod 35 will result in an actuation of the instrument or other device which is to respond to motions of the diaphragms.

Obviously, the arrangement just above described is merely by way of illustration and is in no way limited as to the type of instrument, device or part which responds to differential pressure. For instance, as shown in Fig. 6, the character K indicates an air-tight rigid housing whose interior is divided by a capsule 19 (like that hereinabove described) to form two chambers 15 and 16 which communicate, by conduits 20 and 21 respectively, with sources of different fluid pressure. The chamber 15 has an aperture in its top wall which is closed leak-tight by a flexible diaphragm P through which passes a rigid lever member L whose lower end is connected by a flexible blade 35$^x$ with the central button 30 (Fig. 2) of the capsule. The lever L has an extension L' above the diaphragm P to which the movable end of a bellows B is connected so that expansion or contraction of the bellows will tend to rock the lever. The lever carries a part F constituting a flapper valve cooperable with an air delivery nozzle N. An air relay not shown (within the case H), supplied with air at constant pressure, delivers air to the nozzle and to the bellows—the device thus constituting apparatus of the force-balance type and responding to differential pressures in the chambers 15 and 16.

In Fig. 3 a slight modification is illustrated, wherein the core 22$^a$ has a large central opening in which there is located an axially movable rigid connecting member 50. The diaphragms D$^2$ and D$^3$ are provided with central openings and the inner margins of the diaphragms are welded or otherwise secured leak-tight to the opposite ends of the member 50, here shown as spool-shaped. The barrel portion of this spool-like member 50 is of a diameter slightly less than that of the passage through the core 22$^a$, leaving an annular space 51 surrounding the part 50. This annular space communicates with the spaces between the diaphragms D$^2$ and D$^3$ and the core 22$^a$. The expansion-compensating capsule E is like that above described, but its rear plate 41 is secured directly to an integral boss 52, formed on the member 50. A passage 53 leads from the interior of the capsule E to the space 51. A rod 54 is screw-threaded into an opening in the part 50 and constitutes the means for transmitting motion to the indicator or other instrument which is actuated by this differential device. It will be seen that the arrangement shown in Fig. 3 is somewhat simpler than that illustrated in Fig. 1, in that the core 22$^a$ consists of a single part and a spool-like part 50 takes the place of the mid-portion of rod 35 and buttons 31 and 32 above described.

In Fig. 4 there is illustrated a further modification, generally similar to that of Fig. 3, but in which the central, movable, spool-like rigid connecting member 50$^a$ is provided with an interior chamber 55 within which there is arranged a sensitive metallic bellows 56 whose closed end is in the chamber 55 and whose open end 57 has a marginal flange 58, which is welded to the wall of chamber 55. It will be understood that the chamber 55 will be filled with the incompressible liquid when the latter is forced in to separate the diaphragms D and D' from the core. It may be understood that in the arrangement shown in Figs. 3 and 4, where no separate backing plates are employed, the opposite surfaces of the unitary core 22$^a$ are of the desired configuration, that is to say, the ridges and intervening valleys are formed directly on the part 22$^a$.

Referring again to the arrangement of Fig. 2, and assuming that the parts have been assembled and that liquid has been forced between the diaphragms D and D' and the backing plates R and R', and that the spaces between these parts have been sealed against leakage of liquid, the capsule may be mounted as shown in Fig. 1 between the separable parts 11 and 12 of the housing or casing. When pressure is admitted through the pipes 20 and 21 to the chambers 15 and 16 respectively, the pressure within these chambers is exerted on the outer faces of the diaphragms D and D', and if the pressure in the chambers 15 and 16 is different, that diaphragm exposed to the pressure which is highest will tend to move toward its adjacent backing plate, while the opposite diaphragm will tend to move away from its backing plate. Since the diaphragms are rigidly connected by means of the rod 35, the rod will partake of the motion of the diaphragms, and through suitable connections or transmission elements, such for instance as above suggested the movement of the diaphragms will be made manifest, for example, visually, or in the operation of some mechanical or electrical device. However, as above suggested, the diaphragms may have as their primary function the conversion of the differential pressures into force rather than motion. Since the space between the diaphragms 40 and 41 communicates with the passage 34, any thermal expansion or contraction of the liquid which intervenes between the diaphragms D and D' and the backing plates will result in a corresponding separation or approach of the diaphragm members 40 and 41. Desirably these members 40 and 41 should be as flexible as possible compatible with requisite strength. It will be evident that if the pressure in chamber 16 becomes excessive the auxiliary diaphragms 40 and 41 will eventually contact and thus support each other. By the provision of this expansion of capsule E, abnormal temperature variations are compensated for. The arrangement of Fig. 3 operates in substantially the same way in this latter respect as that of Fig. 2.

In the arrangement shown in Fig. 4, the fixed end of the bellows 56 is open to the spaces outside of the capsule. If, in the arrangement of Fig. 4, the pressure in the chamber 55 should increase in response to temperature rise, the only effect will be to collapse the bellows 56 slightly, thus preventing such a pressure rise as might move the diaphragms D$^2$ and D$^3$ away from the opposite sides of the core 22$^a$. In this way the temperature variations are compensated for, so that the diaphragms D and D' respond only to differential pressures in the chambers 15 and 16.

While a temperature compensating device such as above suggested is often desirable, it may be dispensed with whenever it is practical to keep the volume of the liquid within the capsule so small that changes of its volume, due to temperature increase, will be accommodated by the outward bowing of the two diaphragms D and D' in their free areas between their fixed margins and the central tie rod. Moreover, if a suitable liquid is available having a very low coefficient of thermal expansion together with other properties requisite in a device of this type, the employment of such a liquid alone may make unnecessary the use of the expansion capsule.

While certain desirable embodiments of the invention have herein been illustrated by way of example, it is to be understood that the invention is broadly inclusive of any and all modifications falling within the scope of the appended claims.

I claim:

1. A differential pressure-responsive device of the kind wherein a pressure-sensitive capsule forms a partition separating two chambers within a rigid casing and having means for admitting different fluid pressures to the respective chambers, the capsule comprising a rigid core with a disc-type flexible diaphragm disposed adjacent to each of the opposite faces respectively of the core, the margins of the diaphragms being substantially flat and being connected to the core, each diaphragm, at least throughout that portion of its area which intervenes between the flat margin and its central part, being shaped to have annular ridges alternating with valleys, the core having a passage which extends through it from one to the other of said faces, a substantially incompressible fluid filling said passage and normally holding the diaphragms spaced away from the respective faces of the core, a temperature-compensating capsule having an interior chamber which communicates with said passage and means rigidly connecting the diaphragms so that they must move as a unit in response to differential pressures to which their outer surfaces are subjected, characterized in that the core comprises a rigid disc-like central member, having opposite plain faces, and a rigid backing plate fixed to each of said faces, respectively, each backing plate being coaxial with the central member and of a diameter less than that of the central member thereby leaving a marginal portion of the central member exposed, the flat margins of the respective diaphragms contacting said exposed portions of the central member, means fixing the outer edges of the diaphragms leak-tight to the central member of the core, the outer faces of the backing plates being so contoured and located that, if in response to excess pressure exerted on the outer surface of a given diaphragm the latter moves into contact with the adjacent backing plate, the latter will support the diaphragm at all points and prevent injury to the diaphragm.

2. A pressure-responsive capsule for use in a differential pressure apparatus, said capsule being of the kind which comprises a pair of spaced, flexible, generally parallel disc-type diaphragms disposed adjacent to the opposite faces respectively of a rigid core interposed between said diaphragms, the margins of the diaphragms being fixed leak-tight to the core, the latter having a passage extending through it from one of said faces to the other, a body of incompressible fluid filling the passage and normally spacing the diaphragms from the respective faces of the core, and rigid means uniting the central portions of the two diaphragms whereby the latter are constrained to move as a unit in response to the action of differential pressures applied to the outer surfaces of the diaphragms, characterized in that the core comprises a central disc which is strong and rigid and which has plain outer faces, the core having a circular backing plate at each side, respectively, of the central disc, each backing plate being of a diameter less than that of the central disc and being coaxial with the disc thereby leaving a marginal portion of the central disc exposed for contact with the margin of the adjacent diaphragm, each backing plate having a flat surface which contacts the adjacent plain face of the central disc, the exposed surface of each backing plate having a series of concentric circular ribs alternating with valleys, and each diaphragm having valleys and ribs complemental to the ribs and valleys of the adjacent backing plate.

3. A differential pressure-responsive device according to claim 1, having an auxiliary capsule located in one of said chambers and outside of the main capsule, said auxiliary capsule comprising a pair of disc-type diaphragms united leak-tight at their margins, each diaphragm having a series of concentric circular ribs alternating with valleys and with the ribs of one diaphragm arranged to register with the valleys of the other diaphragm, the diaphragms being so initially biased that they tend to approach and contact so that the ribs of one nest in the valleys of the other, the interior of said auxiliary capsule constantly communicating with the passage through the core of the main capsule whereby the diaphragms of the auxiliary capsule are normally held in spaced relation to provide a chamber which is completely filled by the same incompressible liquid which fills the space within the main capsule.

4. A differential pressure-responsive device according to claim 2, wherein one of the diaphragms has a rigid button fixed to its outer surface at its center, an auxiliary capsule comprising a pair of marginally united disc-type diaphragms, one of said latter diaphragms being fixed at one side to the outer surface of said button, there being a passage which extends through said last-named diaphragm of the auxiliary capsule, through the button, and through the diaphragm of the main capsule thereby providing communication between the interior of the auxiliary capsule and the space within the main capsule, the liquid which fills the spaces in the main capsule also extending into and completely filling the interior of the auxiliary capsule.

5. A pressure-responsive capsule according to claim 2, wherein the means which connects the centers of the diaphragms is a rigid movable member whose opposite ends are fixed to the respective diaphragms and which is disposed within the passage through the core, said rigid member being of such shape and dimensions as to provide a clearance space between it and the wall of the passage through which liquid may flow, characterized in that said rigid member has an internal chamber which is open at one end and which communicates with the clearance space between the rigid movable member and the wall of the passage in the core, and a bellows device which is located within said chamber in the rigid member, the bellows device having a closed end disposed in said chamber, the margin of the opposite end portion of the bellows device being fixed leak-tight to the wall of the chamber in the rigid movable part, the interior of the bellows being open to the space outside of the capsule.

6. A pressure-responsive capsule comprising a rigid core having a passage extending through it from one side to the other of the core, a diaphragm disposed adjacent to each of its opposite sides respectively, a rigid connecting element extending through the passage in the core and having its opposite ends fixed to the respective diaphragms, said rigid connecting element being free to move transversely of the core, the passage in the core being of a diameter such as to provide a clearance space between its wall and the rigid connecting element through which liquid may flow from one side to the other of the core, a substantially incompressible liquid filling said clearance space and normally holding both diaphragms spaced from the core, and means within the space bounded by the planes of the outer surfaces of the diaphragms operative to compensate for temperature variations in said liquid.

7. A pressure-responsive capsule according to claim 6, wherein the temperature compensating means is located within the boundaries of said rigid connecting element.

8. A pressure-responsive capsule according to claim 6, wherein the temperature compensating means comprises a metallic bellows arranged within a cavity in the rigid connecting element.

References Cited in the file of this patent

UNITED STATES PATENTS

| | | |
|---|---|---|
| 2,150,771 | Kollsman | Mar. 14, 1939 |
| 2,407,076 | Harkness | Sept. 3, 1946 |
| 2,705,021 | Wiley | Mar. 29, 1955 |
| 2,751,530 | Armstrong | June 19, 1956 |
| 2,761,471 | Cook | Sept. 4, 1956 |

FOREIGN PATENTS

| | | |
|---|---|---|
| 510,079 | Canada | Feb. 15, 1955 |